United States Patent [19]

Tanno et al.

[11] Patent Number: 5,283,777
[45] Date of Patent: Feb. 1, 1994

[54] THREE-DIMENSIONAL OPTICAL RECORDING MEDIUM AND OPTICAL INFORMATION RECORDING APPARATUS USING THE SAME

[75] Inventors: Naohiro Tanno, 15-27, Matsumi-cho, Yamagata; Teruo Toma; Kiyofumi Chikuma, both of Tsurugashima, all of Japan

[73] Assignees: Pioneer Electronic Corporation, Tokyo; Naohiro Tanno, Yamagata, both of Japan

[21] Appl. No.: 800,133

[22] Filed: Nov. 29, 1991

[30] Foreign Application Priority Data

Apr. 26, 1991 [JP] Japan .................................. 3-097650

[51] Int. Cl.$^5$ .............................................. G11B 7/00
[52] U.S. Cl. ................................. 369/108; 369/116; 369/103; 359/11; 359/24; 385/124
[58] Field of Search ................... 359/7, 10, 11, 24, 30; 369/108, 116, 103; 385/124

[56] References Cited

U.S. PATENT DOCUMENTS

| | | | |
|---|---|---|---|
| 3,847,465 | 11/1974 | Micheron et al. | 359/24 |
| 3,937,555 | 2/1976 | Kurtz | 359/11 |
| 5,151,799 | 9/1992 | Ansley | 359/11 |
| 5,191,574 | 3/1993 | Henshaw et al. | 369/103 |

FOREIGN PATENT DOCUMENTS

| | | | |
|---|---|---|---|
| 0446063 | 9/1991 | European Pat. Off. | G11B 7/00 |
| 2-210627 | 8/1990 | Japan | G11B 7/00 |

OTHER PUBLICATIONS

Patent Abstracts of Japan vol. 14, No. 508 (P-1128) Nov. 7, 1990.
Patent Abstracts of Japan vol. 13, No. 80 (P-832) Feb. 23, 1989.
IBM Technical Disclosure Bulletin vol. 32, No. 38, Aug. 1989, Armonk, N.Y., pp. 344–347 "Multi-layer Optical Memory Device".

*Primary Examiner*—Paul M. Dzierzynski
*Assistant Examiner*—Drew A. Dunn
*Attorney, Agent, or Firm*—Sughrue, Mion, Zinn, Macpeak & Seas

[57] ABSTRACT

A three-dimensional optical recording medium is made of a photo-induced refractive index-changing material or two-photons absorbing material, which is based on photo-dissociation or photopolymerization. An optical information recording apparatus comprises a device for loading a three dimensional recording medium; a device for generating a high coherent optical pulse or a train of partially-coherent optical waves; a device for splitting the optical pulse into two pulse components and causing the two pulse components to propagate in the recording medium from opposite directions to meet at a predetermined three-dimensional position; a device for converging a light beam in the recording medium into a parallel beam; and a device for discretely scanning the meeting position of the pulse components to ensure three-dimensional recording in accordance with information to be recorded. Optical pulses or a train of optical waves are permitted to meet at a predetermined three-dimensional position in such a three-dimensional recording medium whose refractive index changes according to light intensity, thus ensuring three-dimensionally information recording as a discrete distribution of refractive indices at high density.

13 Claims, 8 Drawing Sheets

THREE-DIMENSIONAL OPTICAL RECORDING MEDIUM AND OPTICAL INFORMATION RECORDING APPARATUS USING THE SAME

BACKGROUND OF THE INVENTION

1. Field of the Invention

The present invention relates to a three-dimensional optical recording medium made of a material whose refractive index varies depending on the light intensity of an optical pulse or a train of optical waves, and an optical information recording apparatus which causes optical pulses or a train of optical waves to meet at a predetermined three-dimensional position in the recording medium in accordance with information to be recorded to form refractive-index changing portions, thereby permitting the information to be recorded or written once.

2. Description of the Related Art

As one type of the conventional optical recording techniques of recording or writing information once on recording media typified by a compact disk and a laser disk, there is a system of recording pits on the surface of a disk-shaped optical recording medium. This optical recording system utilizes a converged laser beam and the heat of the light-absorbed energy to form pits. There is also known a rewritable photo-electromagnetic disk, which utilizes the heat of a laser beam as well as the magnetic rotation to record information as magnetic inversion domains on the surface of the recording film.

Those optical recording systems involve two-dimensional recording media and intermittently scan the surface of such a recording medium with a single converged light beam to perform optical recording information.

Japanese Unexamined Patent Publication No. 2-210627 discloses an optical recording/reproducing apparatus, which uses a three-dimensional recording medium having optical waveguides laminated three-dimensionally and reproduces information from refractive index-discontinuous portions on the recording medium utilizing the condensing property of an objective lens. This recording method forms the refractive index-discontinuous portions as phase-changing portions simply according to the focusing depth of the objective lens, and is generally difficult to record information with an improved spatial resolution below the focusing depth. The refractive index-discontinuous portions may be previously formed as upheavals in the optical waveguide, in which case information cannot be additionally recorded.

The above-described prior art has a physical limitation to improve the surface density of the recording film of a two-dimensional recording medium, and the conventional optical recording methods cannot achieve three-dimensional recording. The last-mentioned method of utilizing the focusing depth of the objective lens cannot improve the spatial resolution.

SUMMARY OF THE INVENTION

It is therefore an object of the present invention to provide a three-dimensional optical recording medium whose refractive index varies depending on the light intensity, and an optical information recording apparatus which causes optical pulses or a train of optical waves to meet at a predetermined three-dimensional position in such a recording medium to thereby three-dimensionally record information to be recorded as a discrete distribution of refractive indices at high density.

In the present invention, in order to achieve the object, there is provided an optical information recording apparatus which comprises a means for loading a three-dimensional recording medium made of a material whose refractive index varies depending on light intensity; a means for generating a high coherent optical pulse or a train of partially-coherent optical waves; a means for splitting the optical pulse into two pulse components and causing the two pulse components to propagate in the recording medium from opposite directions to meet at a predetermined three-dimensional position; a means for converging a light beam in the recording medium into a parallel beam; and a means for discretely scanning the meeting position of the pulse components to ensure three-dimensional recording in accordance with information to be recorded.

A three-dimensional optical recording medium according to the present invention is made of a material such as photo-dissociation polymer or photopolymerizable polymer whose refractive index significantly changes depending on the light intensity. Further, the present invention can permit a pair of coherent optical pulses or a train of coherent optical waves generated from a laser oscillator to meet in the three-dimensional recording medium to double the light intensity at the pulse meeting position and form an interfering fringe, and changes the material for the medium at the pulse meeting position with respect to the background material to thereby improve its refractive index, thus providing an optical memory. This is because the portion with the increased refractive index causes light reflection to the irradiation of reading light, so that the presence or absence of the reflected light can be reproduced as a signal. Furthermore, this invention can discretely or intermittently perform three-dimensional scanning of the pulse meeting position in accordance with information to be recorded to ensure high-density and three-dimensional recording. It is therefore possible to record information three-dimensionally at high density without restrictions imparted on the area of a single disk. In addition, the use of pulses of several picoseconds or a train of optical waves with a coherent length of several tens of microns or shorter can ensure recording of 1-bit information per unit cube of several tens of microns or below in the three-dimensional optical recording medium without being dependent on the focusing depth of the objective lens. The use of the means of causing optical pulses or a train of optical waves to meet in a refractive-index changing medium can therefore provide an optical recording medium with a significantly large capacity as compared with the prior art, as well as can realize three-dimensional temporary recording or three-dimensional write-once type optical recording.

DETAILED DESCRIPTION OF THE PREFERRED EMBODIMENTS

Preferred embodiments of the present invention will now be described referring to the accompanying drawings.

Figure 1:
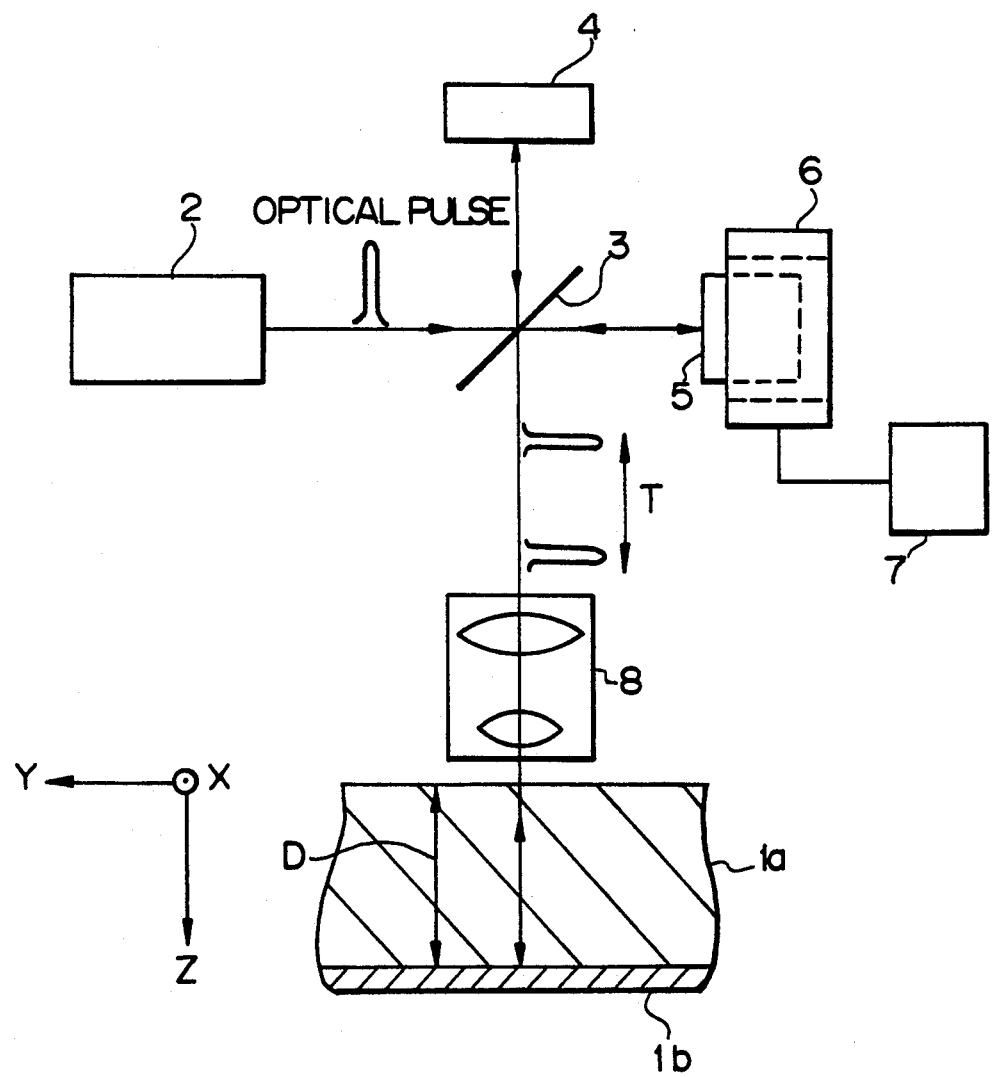
FIG. 1 is a schematic diagram illustrating a three-dimensional optical recording medium according to a first embodiment of the present invention and an optical information recording apparatus using the three-dimensional recording medium.

FIG. 1 illustrates a first embodiment. A three-dimensional optical recording medium $1a$ is a parallel plate made of a material whose refractive index changes according to the intensity of light passing through the recording medium. A reflecting body $1b$ is attached to the surface of that plate which is opposite to a light-incident surface in order to reflect the light back to the recording medium. FIG. 1 shows the partially enlarged cross sections of the planar three-dimensional optical recording medium and the reflecting body. The three-dimensional optical recording medium can be formed to have any outline, such as a thick disk shape, box shape, or card shape. A light-emitting device 2 generates highly coherent optical pulses or a train of partly coherent optical waves. The light-emitting device, which generates highly coherent optical pulse, may be constituted of a mode-lock picosecond pulses ultraviolet laser oscillator, while the light-emitting device, which generates a train of partially coherent optical waves, may be constituted of a wide-range highly luminous ultraviolet light source. A beam splitter 3 is located on the optical axis of the light beam generated from the light-emitting device 2 in order to split the light into two. A fixed mirror 4 is placed on the optical axis of the first light, while a movable mirror 5 and its drive mechanism 6 are located on the optical axis of the second light. The drive mechanism 6 is activated by a control signal generator 7 which generates a drive signal in accordance with information to be recorded. The optical axes of the individual components in the Michelson type arrangement as shown in FIG. 1 are arranged so that the beam splitter 3 splits light pulses from the light-emitting device 2 into two, and the split light pulses are reflected by the fixed mirror 4 and the movable mirror 5 to be superimposed on each other by the beam splitter 3. An objective lens 8 is disposed on the optical axis of the superimposed light to condense the light beams into parallel light. The optical pulse enters in the Z direction of the illustrated X, Y and Z axes, i.e., enters perpendicular to the three-dimensional optical recording medium $1a$.

With the above structure, the movable mirror 5 is shifted relative to the fixed mirror 4 in such a way that the relative distance from the beam splitter 3 to the movable mirror 5 becomes longer than the distance from the beam splitter 3 to the fixed mirror 4, thereby forming an optical-path difference L, for example. As a result, when the bisected first and second optical pulses are reflected and propagate on the superimposed optical axis, the first reflected pulse from the fixed mirror 4 leads by time, and the second reflected pulse from the movable mirror 5 lags by a time $T + 2L/c$ (c: the speed of light). The first and second reflected pulses respectively enter the three-dimensional optical recording medium $1a$. The first reflected pulse is reflected by the reflecting body $1b$, returning back along the original optical path, and meets with the delayed second optical pulse on its way out. The first and second optical pulses meet at a predetermined position apart by $L/n$ (n: the refractive index of the three-dimensional optical recording medium $1a$) from the reflecting body $1b$. By setting $L/n$ shorter than the thickness D of the three-dimensional recording medium $1a$, the meeting position of the first and second optical pulses can always be set within the recording medium. The proper control of the moving distance of the movable mirror 5 in accordance with information to be recorded provides the optical-path difference L discretely to determine the meeting position of the first and second optical pulses in accordance with the presence or absence of information to be recorded, thus permitting the refractive index-changing portion appearing at the pulse meeting position to be recorded or formed as an optical memory.

With the above recording process treated as the first recording by a single optical pulse emitted from the light-emitting device 2, the first recording is carried out at a first predetermined meeting position corresponding to an optical-path difference L1, then the second optical pulse is emitted from the light-emitting device 2 and the associated recording is conducted at a second meeting position corresponding to an optical-path difference L2 different from L1. Likewise a third optical pulse, a fourth optical pulse and so forth are intermittently emitted at the proper intervals, and the associated recordings will be carried out in order in the three-dimensional optical recording medium. In this manner a plurality of pulse meeting portions are formed by the intermittent optical pulses from the light-emitting device 2, and the positions of the meeting portions are determined in accordance with the presence or absence of information to be recorded, by imparting the time delay to the reflected optical pulses by the movement of the movable mirror 5.

When a light beam enters a recording medium made of a photo-induced refractive index-changing material or two-photons absorbing material whose refractive index changes according to the light intensity and is based on photodissociation or photopolymerization, the refractive index of the light-incident portion becomes higher in proportion to the intensity of the incident light.

The photo-induced refractive index-changing materials include cyclized polyisoprene+bisazid or a polymethyl methacrylate type, known as a photosensitive material, and GeO$_2$ doped glass. These materials will undergo changes in properties depending on the intensity of light, and will cause a light refractive portion in the light irradiating portion. The two-photon absorbing material absorbs the energy of two photons at a time to cause electron transition or the like and absorbs light, whereas ordinary light absorbing materials absorb the energy of one photon, $h\nu$ (h: Plank's constant, $\nu$: frequency of light) to cause transition of an electron or molecule to a higher energy state, thereby causing light absorption. The two-photon absorbing material which absorbs the energy of two photons of different frequencies is called a different-frequency two-photon absorbing medium. The material, which permits an electron or molecule that has absorbed one photon and is in a high-energy state to absorb another photon (whose frequency may be different from that of the first photon) to achieve a higher energy state, is called a double-stage absorbing medium. Those materials include metal-free tetraphenyl-porphine, anthracene halide, CdS or GeO$_2$ doped glass and chalcogen glass.

Depending on the material in use, the refractive index changes to incident light with the critical intensity or higher intensity. The following will discuss the principle or forming a refractive index-changing portion at the pulse meeting position when optical pulses enter such a recording medium and meet therein, referring to FIGS. 2A, 2B, 2C and 2D.

Figure 2:
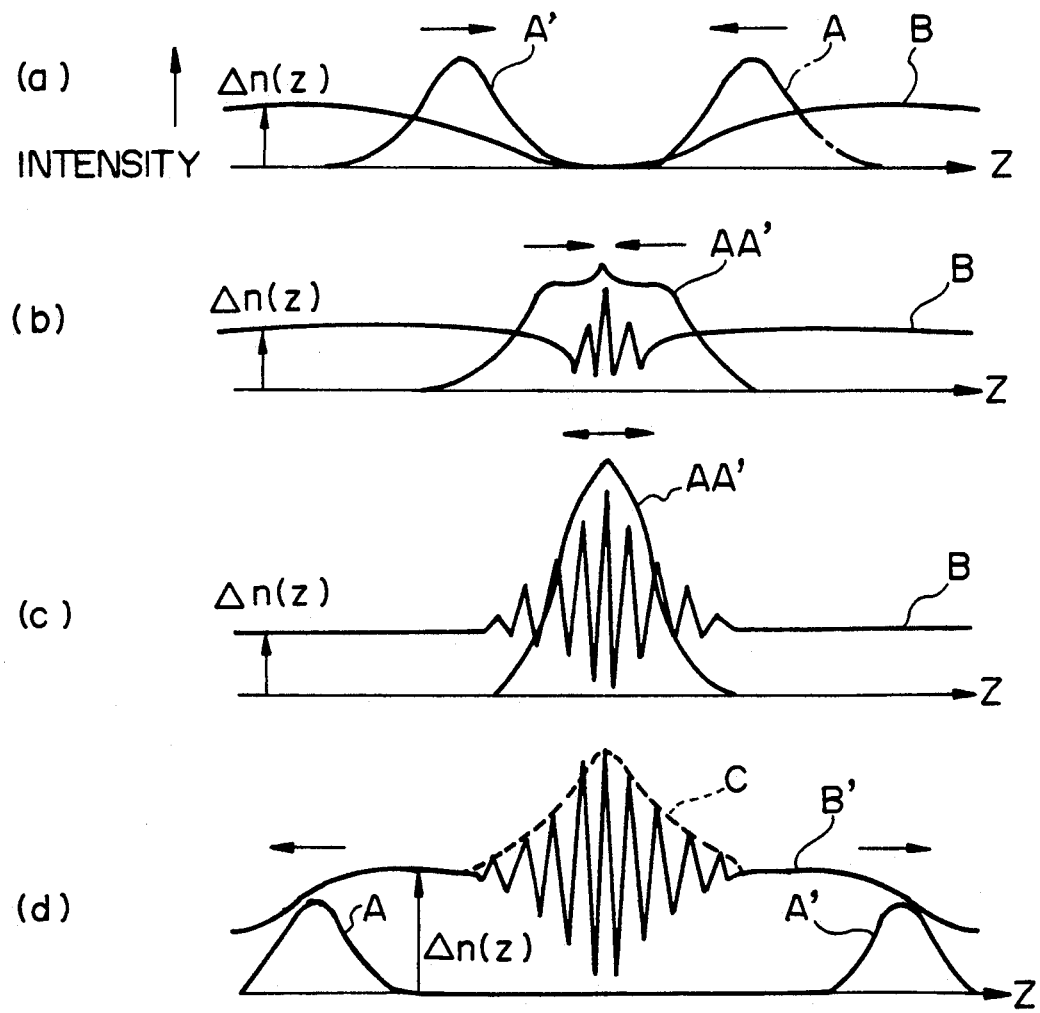
FIG. 2A, 2B, 2C and 2D are partially enlarged cross sectional view for explaining the principle of recording a refractive-index changing portion on the three-dimensional optical recording medium according to the present invention.

With the optical axis of a light beam taken on the Z axis, the first and second optical pulses A and A' which meet as shown in FIG. 2A propagate in the opposite directions (positive and negative directions) along the Z axis. In accordance with the propagation of the individual optical pulses, portions with a change in refractive index, $\Delta/n(z)$ (curve B) is formed in the recording medium. When both optical pulses meet, the light intensity of an optical pulse at the pulse meeting portion AA' increases as shown in FIGS. 2B and 2C, and an interference will occur at the same time, causing the light intensity to be distributed in a wave form. As a result, the aforementioned refractive index-changing portion is formed in the recording medium as shown in FIG. 2D, and a portion B' with a high refractive index remains even after the optical pulses A and A' pass each other. The portion where the optical pulses A and A' have propagated and passed each other have the high refractive index portion B' and a greater refractive index-changing portion C (envelope) will be formed at the pulse meeting position, thus realizing an optical memory. When the interference property of the optical pulses is deteriorated during propagation or their optical axes are slightly shifted, the interfering fringe becomes incomplete, but the refractive index-changing portion at the pulse meeting position still rises like the high refractive index-portion C as indicated by the dotted line in FIG. 2D.

Even when the description is given by replacing this optical pulses are replaced with a train of optical waves, which have a wavelength corresponding to the coherent length of the pulses from the light-emitting device and are partially coherent, the same effect can be attained in principle. In other words, provided that the light-emitting device 2 in FIG. 1 serves as a light source, and the spatial length of the optical pulses is considered as the length of a train of interfereable optical waves, the light intensity at the portion where the optical waves meet and interfere with each other becomes higher as in the above-described case, thus ensuring optical recording. That is, the use of time-dependent coherent light can achieve information recording on a three-dimensional optical recording medium.

Figure 3:
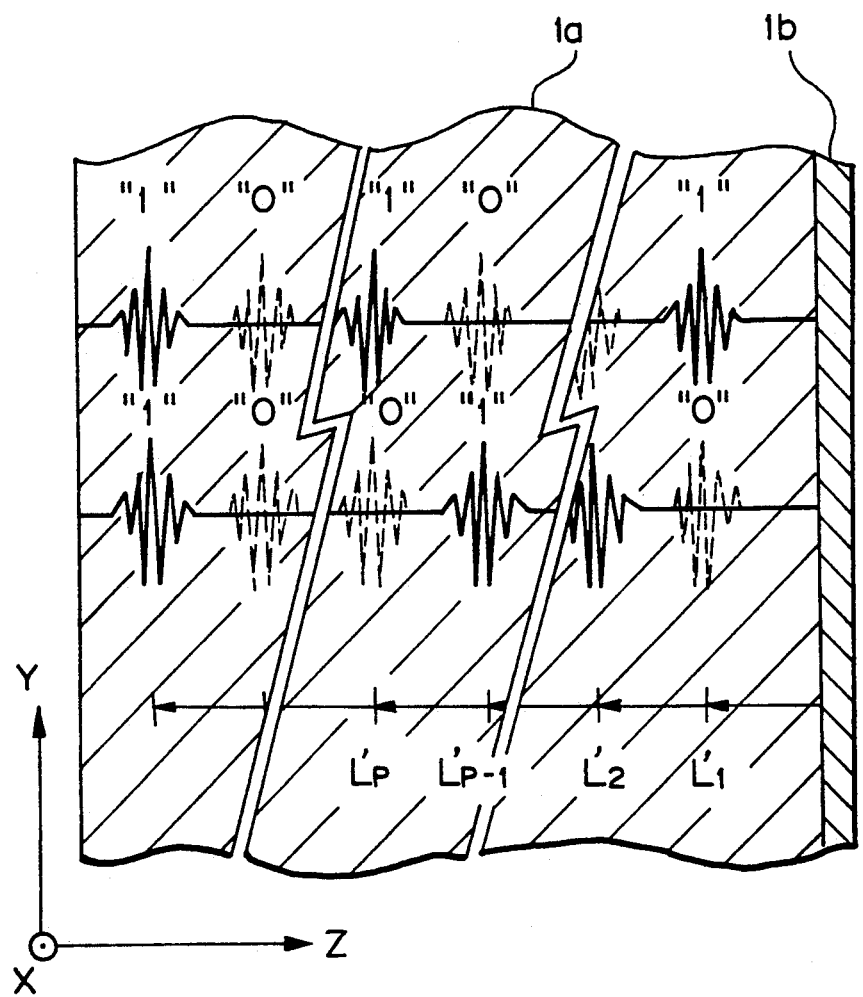
FIG. 3 is a partially enlarged cross section of a three-dimensional optical recording medium with the refractive-index changing portion recorded in the first embodiment.

By moving the movable mirror 5 in FIG. 1 to change the aforementioned pulse meeting position, the refractive-index changing portions are successively recorded at positions $L'_1, L'_2, \ldots, L_p, \ldots, (L'_i = L_i/n)$ on the Z axis of the three-dimensional optical recording medium 1a shown in FIG. 3 in accordance with information to be recorded. Further, the light incident positions to the three-dimensional optical recording medium 1a is changed to record the refractive index-changing portions at the associated portions in the three-dimensional space. The displacements of the light incident position along the X axis and the Y axis depend on the displacement of the relative positions from the assembly portion from the light-emitting device 2 to the objective lens 8 to the three-dimensional optical recording medium 1a and the reflecting body 1b. In FIG. 3, bit information is recorded so that the presence of a refractive-index changing portion is treated as "1" of a digital memory and the absence of such a portion as "0".

The recording density of the three-dimensional optical recording medium 1a depends on the length of a train of optical waves which is determined by the half-width of the optical pulse or the coherent length of the low-coherent light source with respect to the Z axis direction in FIG. 1, and is 20 to 30 $\mu$m or below. The recording density of the X-Y plane is determined by the cross-sectional area of the incident parallel light and is about 80 $\mu$m$^2$, for example. The resultant three-dimensional recording density is one bit/200 $\mu$m$^3$, and a high-density memory with a capacity of 500 Megabits per cm$^3$ can be realized The three-dimensional optical recording medium shown in FIG. 1, if it is a disk five inches in diameter and 10 mm thick, will have the total memory capacity of about 63 Gigabits.

Other embodiments of the present invention will now be described. Same reference numerals are used to specify those components of these embodiments corresponding or identical to the above-described components of the first embodiment, so that only different portions will be described below.

Figure 4:
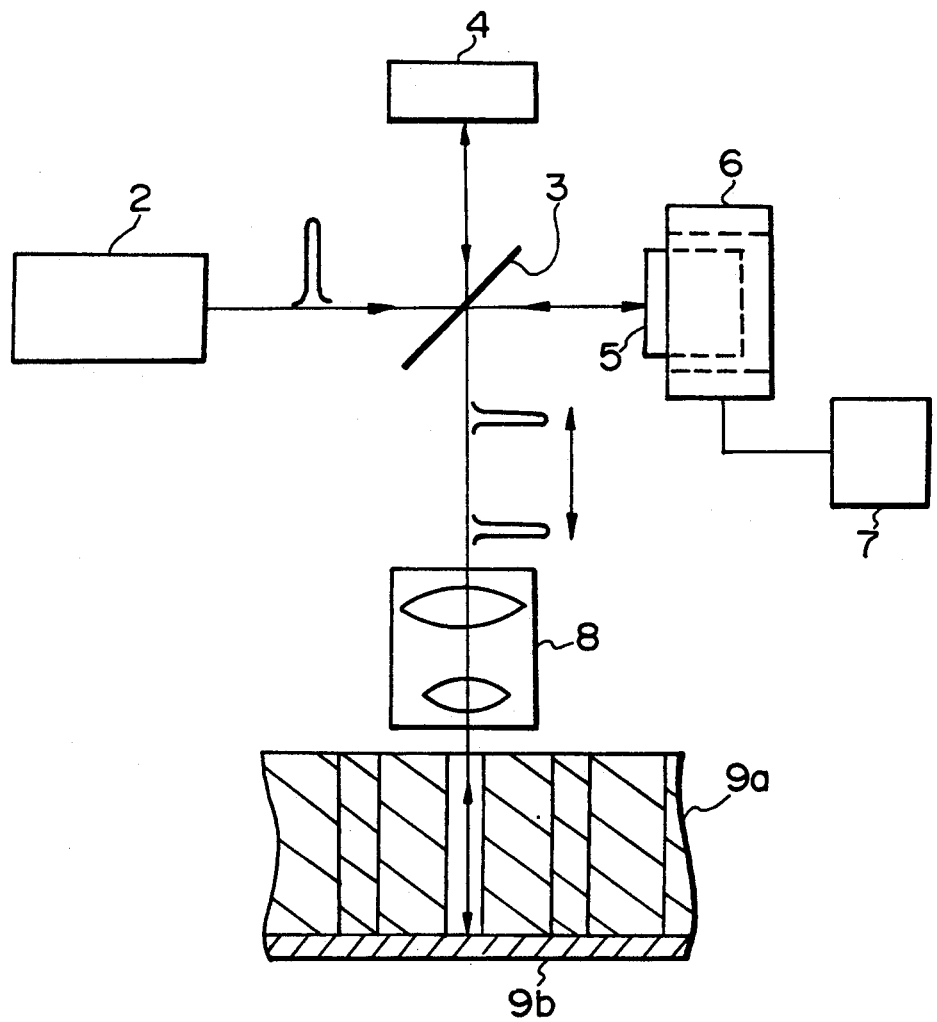
FIG. 4 is a schematic diagram illustrating a three-dimensional optical recording medium according to a second embodiment of the present invention and an optical information recording apparatus using that three-dimensional optical recording medium.
Figure 5:
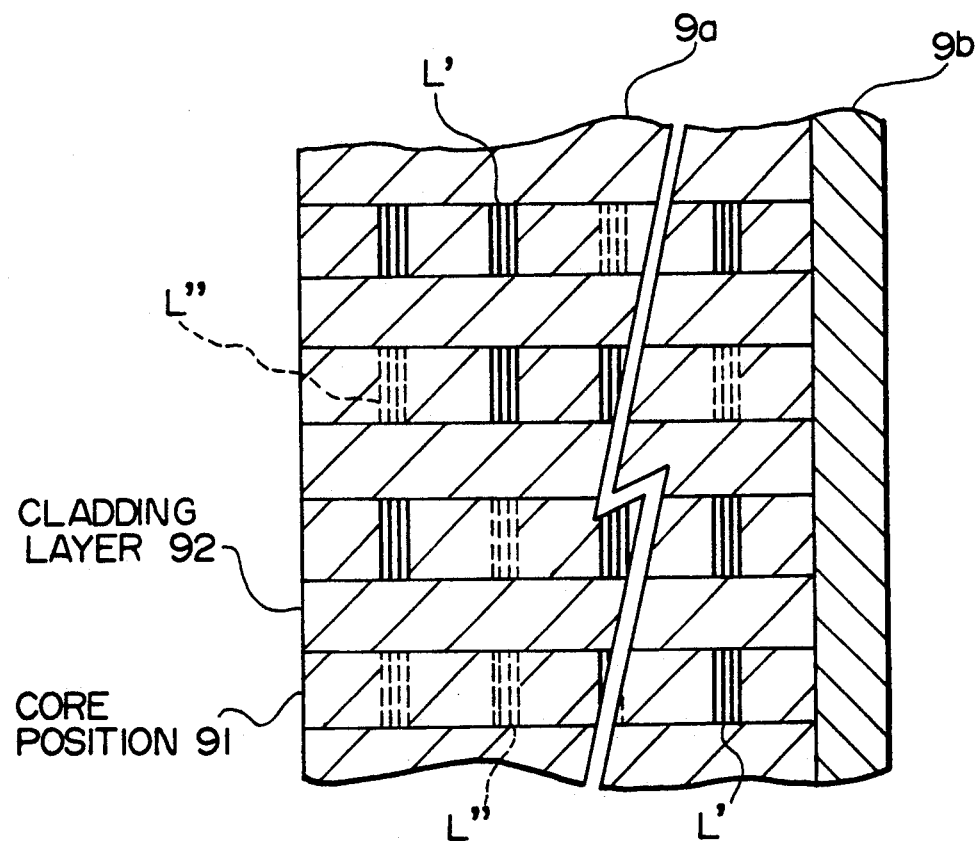
FIG. 5 is a partially enlarged cross section of a three-dimensional optical recording medium with the refractive-index changing portion recorded in the second embodiment.

FIG. 4 shows the second embodiment of the present invention. In this embodiment, a three-dimensional optical recording medium 9a is an optical-waveguide recording medium where a plurality of optical waveguide including a core 91 and a cladding 92 are arranged laminated one on another in parallel. One end of each optical waveguide of the three-dimensional optical recording medium 9a serves as a photocoupler, and a reflecting body 9b playing the role of reflecting the guided light is attached to the other end of the recording medium 9a. Optical pulses or a train of the light waves for information recording are photocoupled by the objective lens 8 to enter the end surface of the core 91 of the optical waveguide. The incident optical pulses or the train of light waves are reflected by the reflecting body 9b to propagate back and forth inside the light waveguide and meet each other in the above-described manner, recording a refractive index-changing portion in the core 91. FIG. 5 shows where the refractive index-changing portions recorded in the core 91 are present (indicated by vertical solid lines L') and absent (indicated by vertical solid lines L"). The presence or absence of the refractive index-changing portions becomes bit information.

Figure 6:
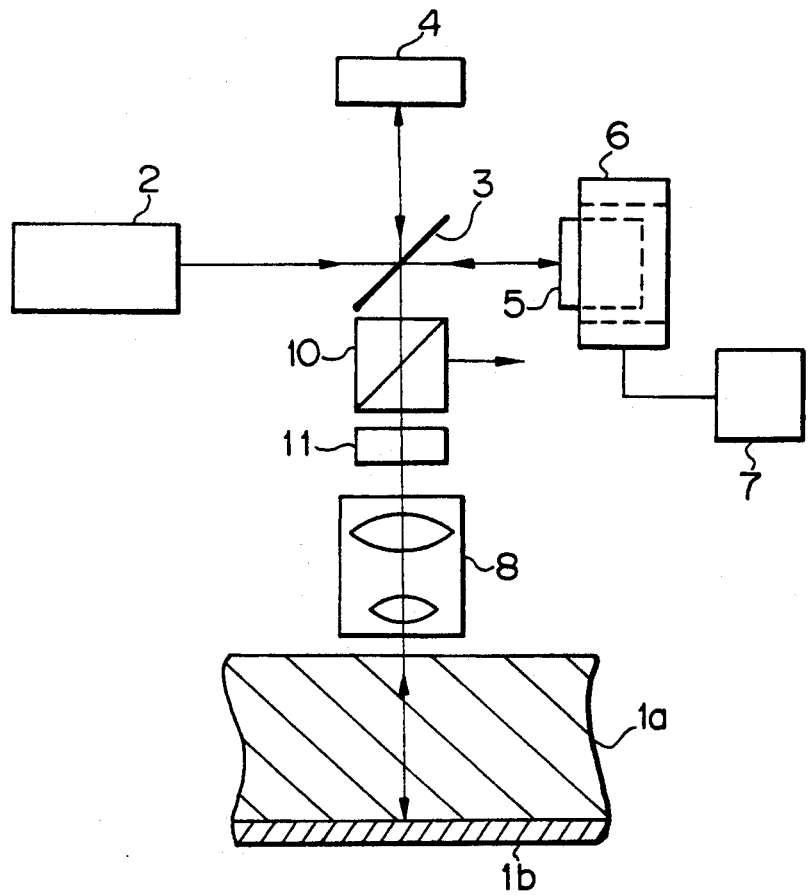
FIG. 6 is a schematic diagram illustrating a three-dimensional optical recording medium according to a third embodiment of the present invention and an optical information recording apparatus using that three-dimensional optical recording medium.

FIG. 6 illustrates the third embodiment of the present invention. A polarizing beam splitter 10 and a quarter-wave plate 11 are placed on the incident optical path between the beam splitter 3 and the objective lens 8. The electric field induced by light beams traveling through the polarizing beam splitter 10 after passing through the beam splitter 3, includes only linearly polarized components in parallel to the diagram. These linearly polarized components, after passing through the quarter-wave plate 11, become circular polarization, which then enters the three-dimensional optical recording medium 1a. The electric field induced by light beams reflected by the reflecting body 1b to be used in the recording action and returning along the original optical path from the three-dimensional recording medium 1a, becomes linear polarization normal to the sheet of the diagram due to the retransmission through the quarter-wave plate 11. This linear polarized light does not advance through but is reflected by the polarized beam splitter 10, and guided away from the incident light path. The optical pulses or the train of light waves remaining after recorded therefore will be reflected by the fixed mirror 4 and the movable mirror 5 again to transmit the incident light path, thus eliminating repetition of unnecessary recording action.

Figure 7:
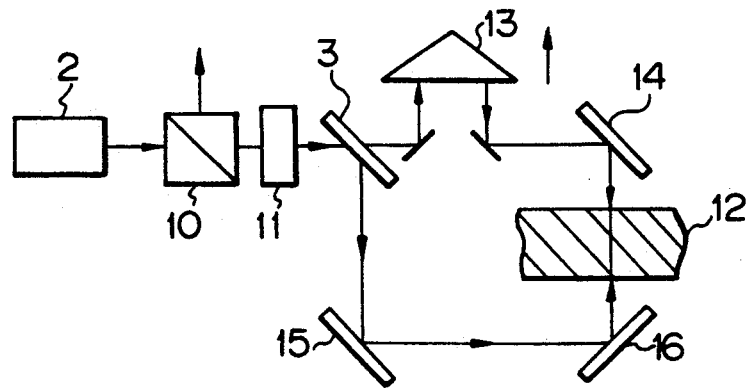
FIG. 7 is a schematic diagram illustrating a three-dimensional optical recording medium according to a fourth embodiment of the present invention and an optical information recording apparatus using that three-dimensional optical recording medium.

FIG. 7 shows the fourth embodiment of the present invention. A three-dimensional optical recording medium 12 is designed without a reflecting body and to receive light both at the top and bottom surfaces. The optical path of one of split light beams is constituted by a movable prism 13 and a reflection mirror 14, and the other optical path by reflection mirrors 15 and 16.

According to this embodiment, a pair of optical pulses or the train of optical waves enter both surfaces of the three-dimensional optical recording medium 12 so as to meet at a predetermined position in the recording medium for recording information there. An optical-path difference occurs by shifting to control the movable prism 13 in accordance with information to be recorded. The light incident position is shifted by changing the relative position of the assembly portion from the light-emitting device 2 to the reflection mirrors 14 and 16 relative to the three-dimensional optical recording medium 12.

Figure 8:
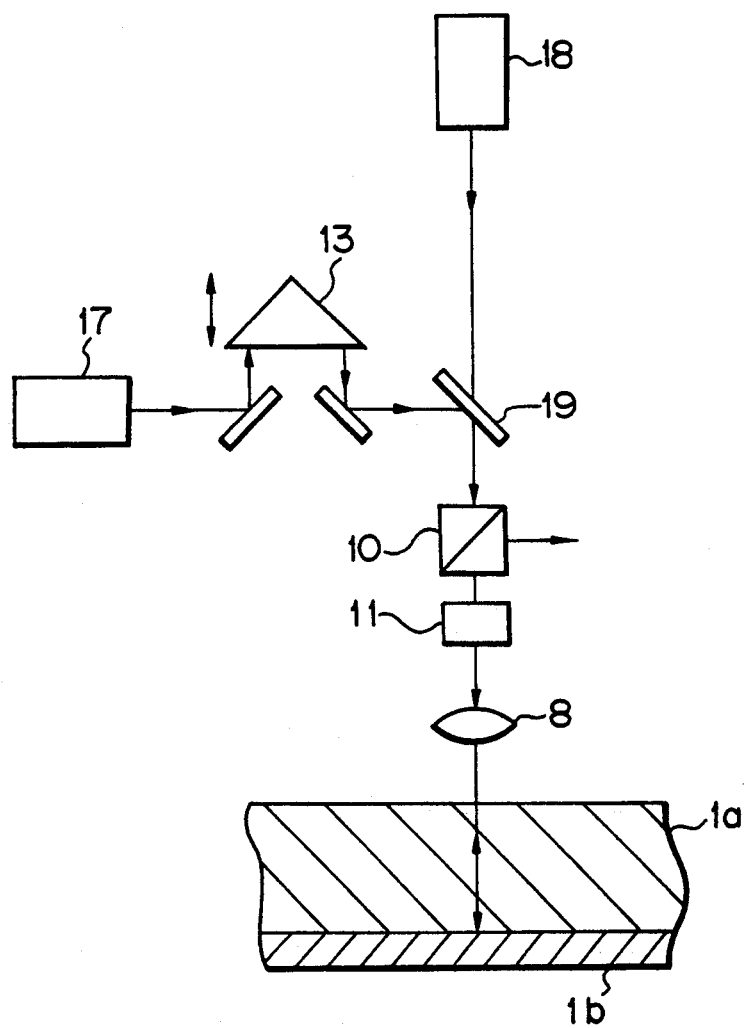
FIG. 8 is a schematic diagram illustrating a three-dimensional optical recording medium according to a fifth embodiment of the present invention and an optical information recording apparatus using that three-dimensional optical recording medium.

FIG. 8 shows the fifth embodiment of the present invention. The three-dimensional optical recording medium 1a is made of a material whose refractive index changes only when two lights of different wavelengths from light-emitting devices 17 and 18, which generate light beam with different wavelengths, exist at the same time. Such a material is, for example, a different frequency two-photon absorbing material or a two-stage absorbing dissociation material. The optical pulses or the train of optical waves from the light-emitting devices 17 and 18 have the optical-path difference controlled by the movement of a movable prism 13. The optical pulses or optical waves are then superimposed on the light beam from the light-emitting device 18 by means of the beam splitter 19. The superimposed light enters the three-dimensional recording medium 1a to record information. The advantage of this embodiment is to efficiently record a change in refractive index only at the position where two optical pulses with different wavelengths or the train of optical waves meet.

Figure 9:
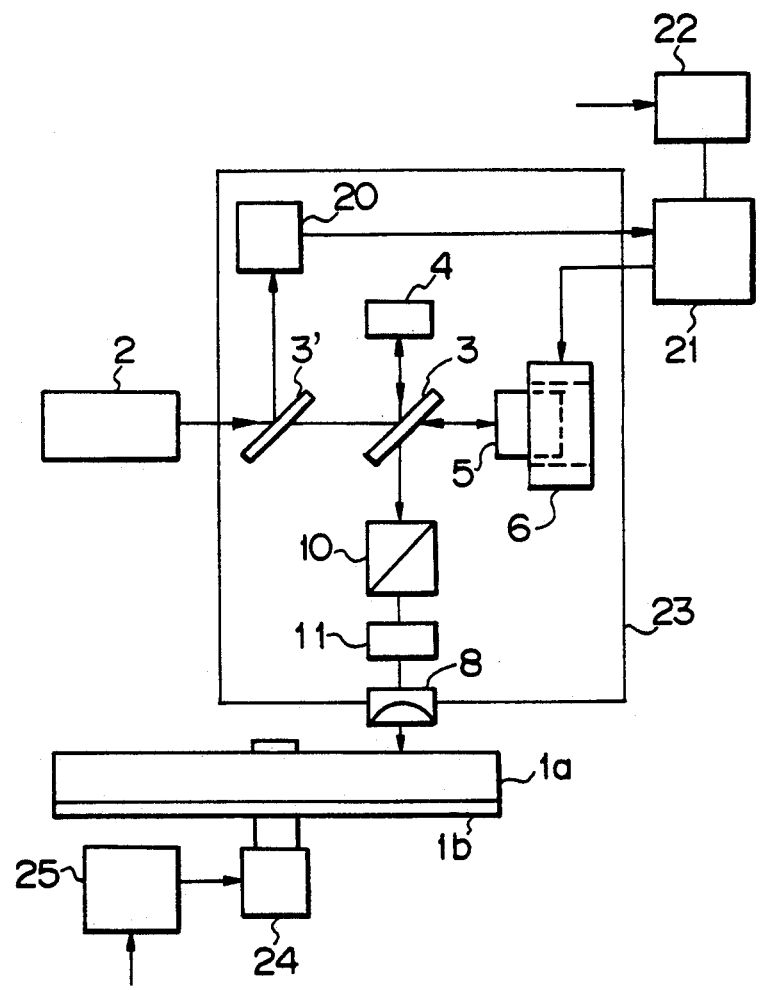
FIG. 9 is a schematic diagram illustrating a three-dimensional optical recording medium according to a sixth embodiment of the present invention and an optical information recording apparatus using that three-dimensional optical recording medium.

FIG. 9 illustrates the sixth embodiment of the present invention. An optical information recording apparatus according to this embodiment includes a beam splitter 3', a photoelectric conversion device 20, a control signal generator 21, an A/D converter 22, and a movable board 23. The beam splitter 3' is provided on the optical axis downstream of the light-emitting device 2 to partly reflect the optical pulses or the train of optical waves from the light-emitting device 2 toward the photoelectric conversion device 20. The photoelectric conversion device 20 detects part of the reflected light beams from the beam splitter 3', and sends a photoelectric conversion signal to the control signal generator 21, which is connected to the A/D converter 22. The A/D converter 22 converts an analog signal to be recorded into a digital signal. The control signal generator 21 combines the digital signal with the photoelectric conversion signal, and based on whether the digital signal is present or absent, the generator 21 then outputs a signal for driving the movable mirror 5. Part of the above-described components are mounted on the movable board 23, which finely moves the position where the light beam enters the three-dimensional optical recording medium 1a in the X and Y directions. The sixth embodiment has an apparatus where a disk type three-dimensional optical recording medium is mounted, and the three-dimensional optical recording medium is rotated by a rotation control motor 24 under the control of a drive controller 25. It is therefore possible to generate a control signal for each pair of optical pulses or each train of light waves to record information at a predetermined position.

As described above, according to the present invention, two optical pulses are permitted to propagate and meet each other in a three-dimensional optical recording medium, made of a material whose refractive index changes according to light intensity or only when two lights with different wavelengths meet each other, thus providing a plurality of refractive index-changing portions to record information. Even if optical waveguides are not fabricated in the recording medium previously, therefore, the light propagate, while creating the light waveguide for its own, so that information can be recorded on the three-dimensional optical recording medium. Further, since optical pulses or a train of light waves meet each other in the three-dimensional optical recording medium, it is possible to provide a three-dimensional optical recording medium with a greater capacity than that of the conventional recording medium as well as to realize write-once optical recording three-dimensionally.

What is claimed is:

1. An optical information recording apparatus comprising:
    a recording light forming means for imparting a relative time lag from a first light to a second light as a variable of information to be recorded; and
    a light emitting means for causing the first and second lights to propagate along a common optical axis in opposite directions so as to meet each other in a three-dimensional optical recording medium, the recording medium being made of a material whose refractive index changes in accordance with an intensity of irradiated light and having a first surface, thereby forming a refractive index-changing portion at a portion where the first and second light meets.

2. An optical information recording apparatus according to claim 1, wherein the recording light forming means comprises:
   a light generating means for generating coherent light;
   a splitting means for splitting the coherent light into the first light and the second light; and
   an optical-path difference generating means for generating an optical-path difference between the first light and the second light relative to a surface of the three-dimensional optical recording medium, and imparting the relative time lag from the first light to the second light as a variable of information to be recorded.

3. An optical information recording apparatus according to claim 2, wherein the light generating means is a light-emitting device for generating a high-coherent optical pulse, and the light is an optical pulse.

4. An optical information recording apparatus according to claim 2, wherein the light generating means is a light-emitting device for generating a low-coherent optical pulse, and the light is a train of low-coherent optical waves.

5. An optical information recording apparatus according to claim 2, wherein the splitting means comprises a beam splitter.

6. An optical information recording apparatus according to claim 2, wherein the optical-path difference generating means has a movable mirror or movable prism for reflecting the second light and wherein the optical-path difference generating means is driven in accordance with an electric signal representing information to be recorded.

7. An optical information recording apparatus according to claim 2, wherein the light meeting means comprises a reflecting body, adhered to the three-dimensional optical recording medium, for reflecting the first light and second light back in the three-dimensional recording medium.

8. An optical information recording apparatus according to claim 2, wherein the light meeting means comprises a pair of mirrors disposed with the three-dimensional optical recording medium therebetween.

9. An optical information recording apparatus according to claim 2, further comprising a polarizing beam splitter and a quarter-wave plate for eliminating light returning from the three-dimensional recording medium disposed on incident and reflecting optical paths of the first and second lights between the light generating means and the three-dimensional optical recording medium.

10. An optical information recording apparatus according to claim 1, wherein the recording light forming means comprises:
    two light generating means for generating first and second lights of different wavelengths; and
    an optical-path difference generating means for generating an optical-path difference between the first light and second light relative to a surface of the three-dimensional optical recording medium, and for imparting the relative time lag.

11. An optical information recording apparatus according to claim 10, wherein the light meeting means comprises a reflecting body, adhered to the three-dimensional optical recording medium, for reflecting the first light and second light back in the three-dimensional optical recording medium.

12. An optical information recording apparatus according to claim 10, further comprising a polarizing beam splitter and a quarter-wave plate for eliminating light returning from the three-dimensional optical recording medium disposed on incident and reflecting optical paths of the first and second lights between the light generating means and the three-dimensional optical recording medium.

13. An optical information recording apparatus according to claim 6, further comprising:
    a photoelectric converting means for partially detecting the coherent light and performing photoelectric conversion thereon;
    a signal converting means for converting an analog signal to be recorded into a digital signal;
    a control means, connected to the photoelectric converting means and the signal converting means, for generating a control signal for controlling a position of the movable mirror or movable prism;
    a drive means, connected to the control means, for driving the movable mirror or movable prism in accordance with the control signal;
    a scanning means for scanning incident positions of the first and second lights along the surface of the three-dimensional optical recording medium; and
    a moving means for moving the three-dimensional optical recording medium.

* * * * *